US009924014B2

(12) United States Patent
Fukuda et al.

(10) Patent No.: US 9,924,014 B2
(45) Date of Patent: Mar. 20, 2018

(54) CORDLESS TELEPHONE EQUIPMENT, CORDLESS TELEPHONE SYSTEM, AND CORDLESS TELEPHONE COMMUNICATION METHOD

(71) Applicant: Panasonic Intellectual Property Management Co., Ltd., Osaka (JP)

(72) Inventors: Hikaru Fukuda, Fukuoka (JP); Eiichi Hatae, Fukuoka (JP); Satoshi Ando, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/355,923

(22) Filed: Nov. 18, 2016

(65) Prior Publication Data

US 2017/0070604 A1    Mar. 9, 2017

Related U.S. Application Data

(63) Continuation of application No. 14/292,251, filed on May 30, 2014, now Pat. No. 9,531,857.

(30) Foreign Application Priority Data

Jun. 6, 2013    (JP) .................................. 2013-120032

(51) Int. Cl.
*H04M 1/72*    (2006.01)
*H04M 1/725*   (2006.01)
(Continued)

(52) U.S. Cl.
CPC ....... *H04M 1/72502* (2013.01); *H04M 7/125* (2013.01); *H04W 84/045* (2013.01);
(Continued)

(58) Field of Classification Search
None
See application file for complete search history.

(56) References Cited

U.S. PATENT DOCUMENTS 5,983,098 A    11/1999 Gerszberg et al.
6,804,532 B1   10/2004 Moon et al.
(Continued)

FOREIGN PATENT DOCUMENTS

DE    10 2011 054 627 A1    4/2013
JP        2000-253448 A     9/2000
(Continued)

OTHER PUBLICATIONS

Extended European Search Report dated Dec. 8, 2014, for corresponding EP Application No. 14170191.2—1972, 8 pages.

*Primary Examiner* — Steven H Nguyen
(74) *Attorney, Agent, or Firm* — Seed IP Law Group LLP

(57) ABSTRACT

Cordless telephone equipment includes a portable unit and a base unit. The base unit includes: a portable unit control section controlling a communication protocol with the portable unit through a wireless interface wirelessly connecting with the non-IP terminal type portable unit; a wireless LAN interface section transmitting and receiving packet data to and from a wireless IP terminal and wireless LAN access point; a wireless LAN bridge control section forwarding the received packet data to the wireless IP terminal, or the wireless LAN access point, or within the base unit in accordance with a destination address of the packet data received through the wireless LAN interface section; and a base unit control section processing the packet data received from the wireless IP terminal and forwarded within the base unit, as data received from a portable unit under control of the base unit.

14 Claims, 11 Drawing Sheets

(51) Int. Cl.
*H04W 84/04* (2009.01)
*H04M 7/12* (2006.01)
*H04W 84/12* (2009.01)
*H04W 84/16* (2009.01)

(52) U.S. Cl.
CPC .... *H04M 2250/06* (2013.01); *H04M 2250/08* (2013.01); *H04W 84/12* (2013.01); *H04W 84/16* (2013.01)

(56) References Cited

U.S. PATENT DOCUMENTS

| | | | |
|---|---|---|---|
| 7,202,789 | B1 | 4/2007 | Stilp |
| 7,327,981 | B2 | 2/2008 | Hundal |
| 7,571,308 | B1 | 8/2009 | Bahl et al. |
| 8,098,709 | B2 | 1/2012 | Wakizaka |
| 8,107,926 | B2 | 1/2012 | Goto |
| 8,126,442 | B2 | 2/2012 | Wolfe |
| 8,144,654 | B2 | 5/2012 | Imai |
| 8,285,311 | B2 | 10/2012 | Hundal |
| 8,315,624 | B2 | 11/2012 | Hundal |
| 8,521,088 | B2 | 8/2013 | Wakizaka |
| 8,528,071 | B1 | 9/2013 | Kwan |
| 8,712,406 | B2 | 4/2014 | Kunii |
| 8,854,990 | B1 | 10/2014 | Baigal |
| 8,958,749 | B2 | 2/2015 | Kunii |
| 9,531,857 | B2 * | 12/2016 | Fukuda ............. H04M 1/72502 |
| 2002/0061748 | A1 | 5/2002 | Nakakita et al. |
| 2004/0013247 | A1 | 1/2004 | Kurokawa |
| 2004/0132485 | A1 | 7/2004 | Charney et al. |
| 2004/0141484 | A1 | 7/2004 | Rogalski et al. |
| 2005/0037787 | A1 | 2/2005 | Bachner, III et al. |
| 2007/0110017 | A1 * | 5/2007 | Fulknier ................. H04L 45/00 370/338 |
| 2007/0153768 | A1 | 7/2007 | Jagadesan et al. |
| 2007/0167156 | A1 | 7/2007 | Hundal |
| 2007/0167157 | A1 | 7/2007 | Hundal |
| 2008/0001734 | A1 | 1/2008 | Stilp et al. |
| 2008/0056208 | A1 | 3/2008 | Hinrikus et al. |
| 2008/0161025 | A1 | 7/2008 | Imai |
| 2008/0207130 | A1 | 8/2008 | Kunii |
| 2008/0207132 | A1 | 8/2008 | Wakizaka |
| 2008/0207231 | A1 | 8/2008 | Kunii |
| 2008/0220813 | A1 * | 9/2008 | Brown ................. H04L 12/5692 455/552.1 |
| 2009/0061850 | A1 | 3/2009 | Li et al. |
| 2009/0247127 | A1 | 10/2009 | Goto |
| 2010/0197272 | A1 | 8/2010 | Karaoguz et al. |
| 2011/0047583 | A1 | 2/2011 | Howard et al. |
| 2011/0122810 | A1 | 5/2011 | Hodroj et al. |
| 2011/0206054 | A1 * | 8/2011 | Pajjuri ................. H04W 36/14 370/401 |
| 2012/0259965 | A1 | 10/2012 | Tsuzuki et al. |
| 2012/0307727 | A1 | 12/2012 | Yamada |
| 2012/0309371 | A1 | 12/2012 | Yamada |

FOREIGN PATENT DOCUMENTS

| | | |
|---|---|---|
| JP | 2005-286376 A | 10/2005 |
| JP | 2006-025020 A | 1/2006 |
| JP | 2008-205748 A | 9/2008 |
| JP | 2008-244978 A | 10/2008 |
| WO | 2009/078843 A1 | 6/2009 |

* cited by examiner

| BASE UNIT IP ADDRESS (XXX. XXX. XXX. XXX) |
|---|
| BASE UNIT MAC ADDRESS (MAC#1) |
| AP_MAC ADDRESS |
| PORTABLE UNIT 1 MAC ADDRESS |
| PORTABLE UNIT 2 MAC ADDRESS |
| PORTABLE UNIT 3 MAC ADDRESS |
| PORTABLE UNIT 4 MAC ADDRESS |
| PORTABLE UNIT 5 MAC ADDRESS |

*FIG. 10*

| | EXTENSION NUMBER | CONNECTION STATE | EXTENSION NAME | PORTABLE UNIT TYPE | MAC ADDRESS | AUTHORIZATION ID | AUTHORIZATION PW |
|---|---|---|---|---|---|---|---|
| PORTABLE UNIT 1 | 11 | CONNECTED | INT11 | CDL(DECT) | — | — | — |
| PORTABLE UNIT 2 | 12 | CONNECTED | INT12 | CDL(DECT) | — | — | |
| PORTABLE UNIT 3 | 13 | CONNECTED | INT13 | WIRELESS IP (SIP) | XX-XX-XX-5F-43-21 | INT13 | XX5F4321 |
| PORTABLE UNIT 4 | 14 | REGISTERED | INT14 | WIRELESS IP (SIP) | XX-XX-XX-5F-43-22 | INT14 | XX5F4322 |
| PORTABLE UNIT 5 | 15 | UNREGISTERED | UNREGISTERED | UNREGISTERED | — | — | |

*FIG. 11*

CORDLESS TELEPHONE EQUIPMENT, CORDLESS TELEPHONE SYSTEM, AND CORDLESS TELEPHONE COMMUNICATION METHOD

TECHNICAL FIELD

The present invention relates to cordless telephone equipment, a cordless telephone system, and a cordless telephone communication method.

BACKGROUND ART

In recent years, mobile telephones (including so-called "cellular phone" or "smartphone") that make a connection to a mobile telephone network are provided with a wireless LAN communication unit (Wi-Fi (registered trademark) function conforming to the IEEE 802.11 standards), and such a mobile telephone can be used to connect to the Internet under a wireless LAN environment at home or at an office (hereunder, referred to as "in the home") and utilize a variety of Internet services such as Web browsing and IP telephone services and the like.

In the home, a cordless telephone set that makes a connection to a landline telephone network is provided, and the cordless telephone set is shared by a plurality of people such as family members, while a mobile telephone is used for personal use. Thus, the cordless telephone set and the mobile telephone are utilized as telephone sets for completely independent uses. In this respect, technology that connects such a cordless telephone set to a mobile telephone is disclosed, for example, in PTLs 1 to 3.

PTL 1 discloses a cordless telephone system that uses PHS (Personal Handy-phone System) technology to enable, by switching a communication mode of a mobile telephone between a public-network mode and a home-network mode, combined use of the mobile telephone as a mobile telephone when outdoors and as a portable unit of a cordless telephone set in the home.

PTL 2 discloses a telephone set system in which a wireless IP telephone (portable unit) is connected to a base unit having a telephone network control circuit (landline telephone network communication unit) and a digital wireless communication unit (wireless LAN communication unit) to thereby utilize the wireless IP telephone as an Internet wireless telephone set.

In addition, PTL 3 describes a multifunction machine that includes an existing cordless telephone transceiver unit and a wireless LAN transceiver unit and in which a cordless telephone and a wireless LAN coexist, and which enables calls without sound interruptions or delays with a cordless telephone set.

CITATION LIST

Patent Literature

PTL 1
Japanese Patent Application Laid-Open No. 2000-253448
PTL 2
Japanese Patent Application Laid-Open No. 2006-025020
PTL 3
Japanese Patent Application Laid-Open No. 2008-244978

SUMMARY OF INVENTION

Technical Problem

However, the main object of the cordless telephone system described in PTL 1 is, with respect to utilization of the home-network mode of the PHS telephone set, to switch the PHS telephone set used outdoors in the public-network mode to the home-network mode to thereby enable the PHS telephone set to be used as a portable unit of a cordless telephone set in the home. Thus, the cordless telephone system disclosed in PTL 1 is not configured to connect to the Internet for communication of a large amount of data at high speed, which is required for Web browsing with a smartphone or the like.

Furthermore, the telephone set system disclosed in PTL 2 is a system in which, with respect to a connection between a base unit and a portable unit of the telephone set system, a known wireless communication technology between a base unit and a portable unit of a cordless telephone set is merely replaced with a wireless LAN technology, and which is not configured to allow a portable unit adopting a known non-wireless LAN system and a portable unit adopting a wireless LAN system to coexist and interconnect.

In addition, the multifunction machine disclosed in PTL 3 is not configured to connect to or relay received packets from a wireless IP terminal to a wireless access point through a wireless LAN transceiver section and is not configured to control a wireless IP telephone as a cordless telephone portable unit either. In particular, when it is difficult to connect a wireless access point and a wireless IP terminal in an environment in which radio signals hardly reach a wireless IP terminal, such as in a large home, a demand for such relays arises.

The present invention has been made in view of the above described circumstances and utilizes a wireless IP terminal including a wireless LAN communication function capable of connecting to the Internet as a cordless telephone portable unit in the home and outside the home and also allows the wireless IP terminal to coexist and interconnect with a cordless telephone portable unit having no wireless LAN communication function in the home. The present invention thus provides cordless telephone equipment, a cordless telephone system, and a cordless telephone communication method that relay the radio signals between the wireless IP terminal and the wireless access point even in a home in which radio signals hardly reach a wireless IP terminal directly from a wireless access point.

Solution to Problem

Cordless telephone equipment according to an aspect of the present invention includes: a portable unit that is a non IP terminal; and a base unit that connects with the portable unit wirelessly, in which the base unit includes: a portable unit control section that controls a communication protocol between the base unit and the portable unit through a wireless interface that wirelessly connects with the portable unit of the non-IP terminal type; a wireless LAN interface section that transmits and receives packet data to and from a wireless IP terminal and a wireless LAN access point; a wireless LAN bridge control section that forwards the received packet data to the wireless IP terminal, or the wireless LAN access point, or within the base unit in accordance with a destination address of the packet data received through the wireless LAN interface section; and a base unit control section that processes the packet data received from the wireless IP terminal and forwarded within the base unit, as data received from a portable unit under control of the base unit.

A cordless telephone system according to an aspect of the present invention includes: the cordless telephone equipment according to the aspect of the invention mentioned above; and a wireless IP terminal that transmits and receives packet data to and from a base unit of the cordless telephone equipment through a wireless LAN, and whose calls are to be controlled as a portable unit under control of the base unit.

A communication method according to an aspect of the present invention is a communication method in cordless telephone equipment including a portable unit that is a non IP terminal and a base unit that wirelessly connects with the portable unit, the communication method being used for the base unit that transmits and receives packet data to and from a wireless IP terminal and a wireless LAN access point, the communication method including: receiving packet data from the wireless IP terminal or the wireless LAN access point; forwarding the received packet data to the wireless IP terminal, or the wireless LAN access point, or within the base unit in accordance with a destination address of the received packet data; and processing packet data received from the wireless IP terminal and forwarded within the base unit, as data received from a portable unit under control of the base unit.

According to the present invention, a wireless IP terminal including a wireless LAN communication function capable of connecting to the Internet is used as a cordless telephone portable unit in the home and outside the home and the wireless IP terminal is allowed to coexist with a cordless telephone portable unit having no wireless LAN communication function in the home, and thus, it is possible to provide cordless telephone equipment that relays radio signals between a wireless IP terminal and a wireless access point even in a home in which radio signals hardly reach a wireless IP terminal directly from a wireless access point.

BRIEF DESCRIPTION OF DRAWINGS

FIG. 10 illustrates an example of a wireless LAN address information table of an SIP server;

FIG. 11 illustrates an example of a portable unit management table of a storage section.

DESCRIPTION OF EMBODIMENT

Hereunder, an embodiment of the present invention are described in detail with reference to the accompanying drawings.

Embodiment

Figure 1:
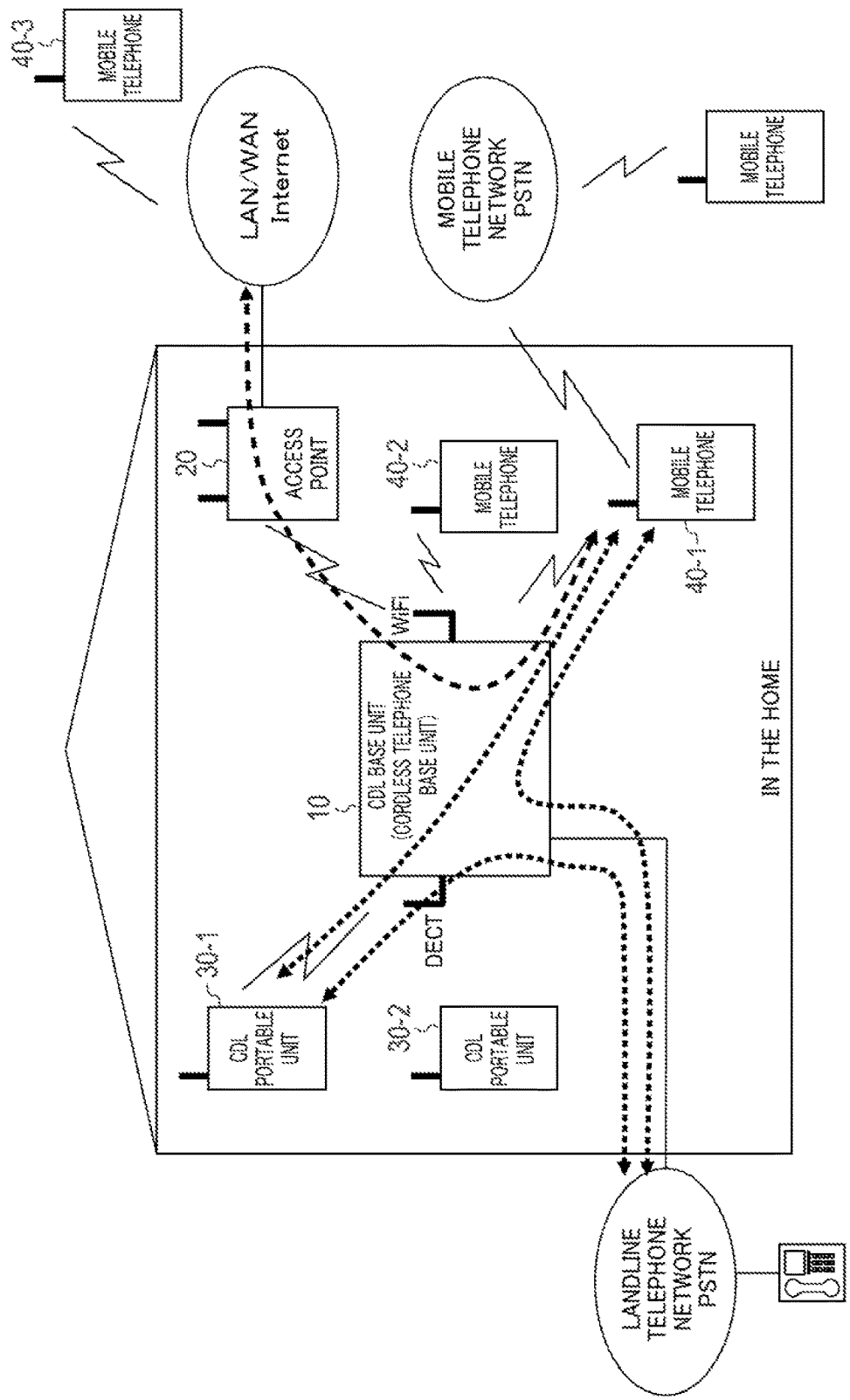
FIG. 1 is a schematic diagram illustrating a configuration of a cordless telephone system according to an embodiment of the present invention.

FIG. 1 is a schematic diagram illustrating the configuration of a cordless telephone system according to an embodiment of the present invention.

Hereunder, the configuration of the cordless telephone system will be described using FIG. 1. Note that in the following description, although mobile telephones, which include cellular phones and smartphones, are described as an example of a wireless IP terminal with VoIP (Voice over IP) function, the present invention is not limited thereto.

In FIG. 1, cordless telephone base unit 10 is provided in a home, and is connected to the Internet through access point 20 that also has a function as a wireless router, and is also connected to a landline telephone network. It is assumed that there are also cordless telephone portable units (CDL portable units) 30-1 and 30-2 that connect with cordless telephone base unit 10, and mobile telephones 40-1 and 40-2 that connect with cordless telephone base unit 10, a mobile telephone network and a wireless LAN in the home. Furthermore, it is assumed that mobile telephone 40-3 that has similar functions to mobile telephones 40-1 and 40-2 exists outside the home. Note that, the cordless telephone portable units are collectively referred to as "cordless telephone portable unit 30" unless a specific cordless telephone portable unit is distinguished, and the mobile telephones are collectively referred to as "mobile telephone 40" unless a specific mobile telephone is distinguished. It is assumed that mobile telephone 40 is connected by Wi-Fi protocol to cordless telephone base unit 10.

In FIG. 1, cordless telephone portable unit 30 can connect with the landline telephone network and the mobile telephones through cordless telephone base unit 10. Further, mobile telephone 40 can connect with cordless telephone portable unit 30, the landline telephone network, and access point 20 through cordless telephone base unit 10.

In FIG. 1, cordless telephone portable unit 30 adopts a DECT (Digital Enhanced Cordless Telecommunications) protocol as the wireless communication system for communication between the portable units and the base unit, and cordless telephone portable unit 30 can connect with the landline telephone network and the mobile telephones through cordless telephone base unit 10. Mobile telephone 40 can connect with cordless telephone portable unit 30, the landline telephone network, and access point 20 through cordless telephone base unit 10.

Figure 2:
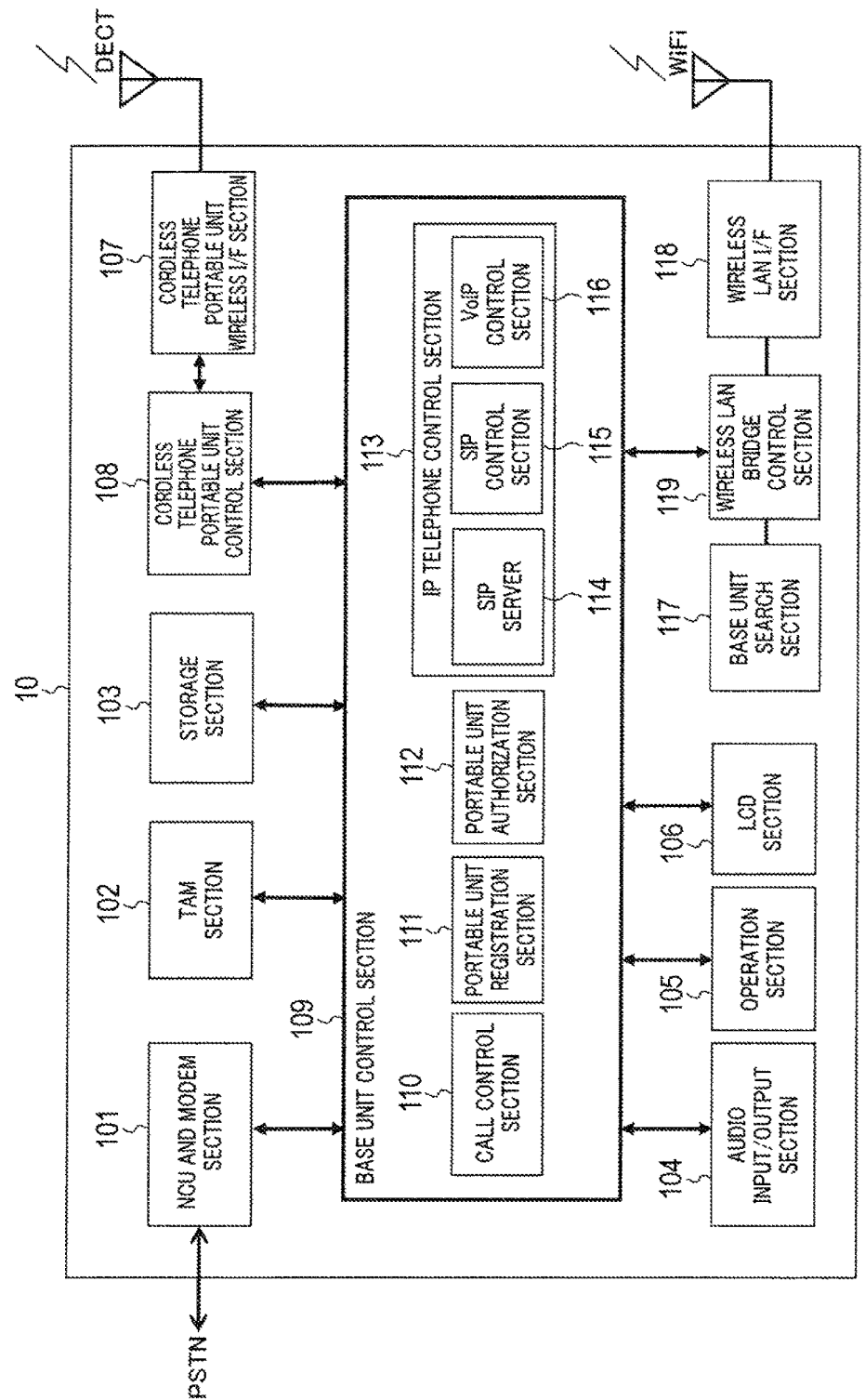
FIG. 2 is a block diagram illustrating a configuration of a cordless telephone base unit shown in FIG. 1.

FIG. 2 is a block diagram illustrating the configuration of cordless telephone base unit 10 shown in FIG. 1. Hereunder, the configuration of cordless telephone base unit 10 will be described using FIG. 2.

NCU (network control unit) and modem section 101 includes a network control unit (NCU) that performs control on a telephone line, including connection with a public network when making an outgoing call, detection of an incoming call from a public network, and the like, and a modem unit that receives caller number information from a public network at the time of an incoming call.

TAM (Telephone Answering Machine) section 102 stores an answering machine message, and performs recording and playback of a voice message.

Storage section 103 stores various kinds of setting data of the cordless telephone equipment, directory data, outgoing and incoming call history information, and portable unit additional information including a communication history of the portable units such as SMS (Short Message Service) messages.

Audio input/output section 104 includes a microphone and a speaker, and outputs a ringtone and also receives and outputs telephone conversation speech.

Operation section 105 includes dial keys and various function keys with which a user performs operations. LCD (liquid crystal display) section 106 displays various kinds of information.

Cordless telephone portable unit wireless I/F section 107 is a circuit that transmits and receives wireless data to and from cordless telephone portable unit 30, and includes an RF/IF (Radio Frequency/Intermediate Frequency) section that performs frequency conversion of radio signals, a modulation/demodulation section that performs modulation and demodulation, and a digital signal processing circuit that performs TDMA signal processing and the like.

Cordless telephone portable unit control section 108 transmits and receives control data to and from cordless telephone portable units 30, and performs protocol control for outgoing calls and incoming calls and the like in accordance with a control protocol (for example, a DECT protocol, a PHS protocol or the like) between cordless telephone base unit 10 and cordless telephone portable unit 30. Note that, in the following description, it is assumed that the DECT protocol is adopted as the control protocol with respect to cordless telephone portable unit 30.

Base unit control section 109 couples with peripheral sections such as NCU section 101 performs overall control of cordless telephone base unit 10. Specifically, base unit control section 109 receives and analyzes events and messages that originate from each section around base unit control section 109, controls the state of outgoing and incoming calls, and issues instructions for call connections to each section.

Call control section 110 processes events and various messages received from NCU and modem section 101, cordless telephone portable unit control section 108, and IP telephone control section 113.

Portable unit registration section 111 performs registration and deletion of portable units (cordless telephone portable unit 30 and mobile telephone 40 (wireless IP terminal)) that are control targets of cordless telephone base unit 10.

Portable unit authorization section 112 performs authorization of connections from portable units (mobile telephones 40) that have been registered in cordless telephone base unit 10.

IP telephone control section 113 processes IP call control messages and voice packets from mobile telephones 40.

SIP (Session Initiation Protocol) server 114 provides location registration and call control for mobile telephones 40 (wireless IP terminals) that adopt SIP protocol for an IP telephone control. Note that, although in this case the SIP server 114 is provided to implement an IP telephone control protocol, if wireless IP terminals that connect to cordless telephone base unit 10 adopt a protocol other than SIP, a call control server corresponding to the protocol may be provided.

SIP control section 115 is an SIP protocol stack that, as a virtual SIP terminal provided inside cordless telephone base unit 10, performs call control procedures in conjunction with SIP server 114, and establishes calls between cordless telephone base unit 10 and mobile telephone 40. Further, SIP control section 115 sends SIP messages or the like received from mobile telephone 40 to the sections of base unit control section 109 (call control section 110, portable unit registration section 111, portable unit authorization section 112) after converting the SIP messages or the like to an internal message format for processing by base unit control section 109, and also converts internal messages received from the sections of base unit control section 109 to SIP messages or the like, sends the resulting SIP messages or the like to SIP server 114 and performs relay processing for controlling mobile telephone 40 as a portable unit under the control of base unit control section 109.

VoIP control section 116 performs encoding of PCM (Pulse Code Modulation) data received from NCU and modem section 101, cordless telephone portable unit control section 108, and audio input/output section 104 to voice packet data, decoding of voice packet data received from mobile telephone 40 to PCM data, and jitter buffer control that adjusts delays and jitter in voice packets.

Base unit search section 117 receives base unit search messages from mobile telephone 40, and sends back address information of the cordless telephone base unit to mobile telephone 40.

Wireless LAN I/F section 118 performs wireless LAN protocol control in accordance with a protocol such as IEEE 802.11 or Bluetooth (registered trademark) to transmit and receive wireless data to and from mobile telephone 40.

Wireless LAN bridge control section 119 analyzes the packet type and destination address information of packet data received via wireless LAN I/F section 118, determines whether to forward the received packets to base unit control section 109 or to access point 20, and performs forward processing.

Wireless LAN bridge control section 119 may operate as a client of access point 20 that performs transmission and reception of packet data to and from mobile telephone 40 via access point 20. In this case, the forward processing of the wireless LAN bridge control section can be omitted.

The following should be noted. When the wireless LAN bridge control section is omitted, and the transmission and reception of packet data is performed as a client of access point 20, naturally, there is no effect of enlarging the utilization range of the mobile telephones by relaying radio signals between mobile telephone 40 and access point 20. Meanwhile, there is no influence on operating the mobile telephone as a portable unit of the cordless telephone equipment.

Figure 3:
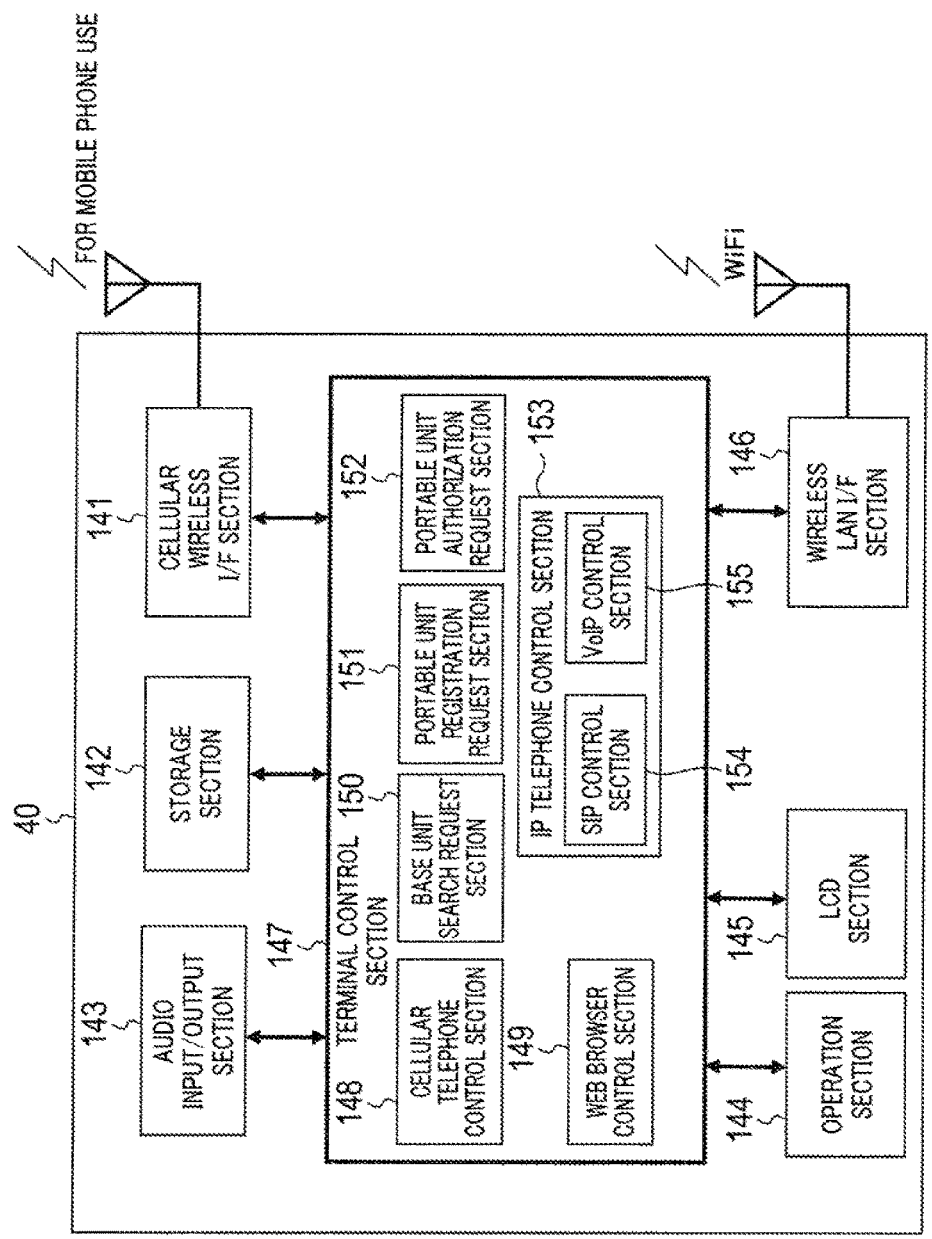
FIG. 3 is a block diagram illustrating a configuration of a mobile telephone (wireless IP terminal) shown in FIG. 1.

FIG. 3 is a block diagram illustrating the configuration of mobile telephone (wireless IP terminal) 40 shown in FIG. 1. Hereunder, the configuration of mobile telephone 40 will be described using FIG. 3.

Cellular wireless I/F section 141 transmits and receives wireless data to and from a mobile telephone base station through a telephone antenna.

Storage section 142 stores various kinds of setting data of the cordless telephone equipment, directory data, outgoing and incoming call history information, and information of SMS messages and the like.

Audio input/output section 143 includes a microphone and a speaker, and outputs a ringtone and also receives and outputs telephone conversation speech.

Operation section 144 includes dial keys and various function keys with which a user performs operations. LCD section 145 displays various kinds of information. Operation section 144 and LCD section 145 may also be included in a touch panel of a smartphone or the like.

Wireless LAN I/F section 146 performs wireless LAN protocol control in accordance with a protocol such as IEEE 802.11 or Bluetooth (registered trademark) to transmit and receive wireless data to and from cordless telephone base unit 10.

Terminal control section 147 performs overall control of mobile telephone 40. Specifically, terminal control section 147 receives and analyzes events and messages that originate from each section around terminal control section 147, controls the state of outgoing and incoming calls and the call connection, and issues instructions to each section.

Cellular telephone control section 148 processes call control messages received from cellular wireless I/F section 141 and IP telephone control section 153.

Web browser control section 149 includes a browser program to display webpages and to navigate the Internet.

Base unit search request section 150 generates multicast packets for searching for cordless telephone base unit 10 that can be connected to by wireless LAN, and causes wireless LAN I/F section 146 to send the multicast packets as a base unit search request. Initiation of a base unit search request is performed by a key input operation at operation section 144, touching a predetermined icon on a touch panel, or by periodically activating a base unit search request program.

Portable unit registration request section 151 sends a portable unit registration request message to cordless telephone base unit 10 to request registration as a portable unit under the control of cordless telephone base unit 10.

Portable unit authorization request section 152 requests connection authorization as a portable unit that is registered with cordless telephone base unit 10.

IP telephone control section 153 processes IP call control messages and voice packets.

SIP control section 154 is an SIP standards protocol stack that causes mobile telephone 40 to function as an SIP terminal.

VoIP control section 155 performs encoding of PCM data to voice packet data, decoding of voice packet data received from cordless telephone base unit 10 to PCM data, and jitter buffer control that adjusts delays and jitter in voice packets.

Figure 4:
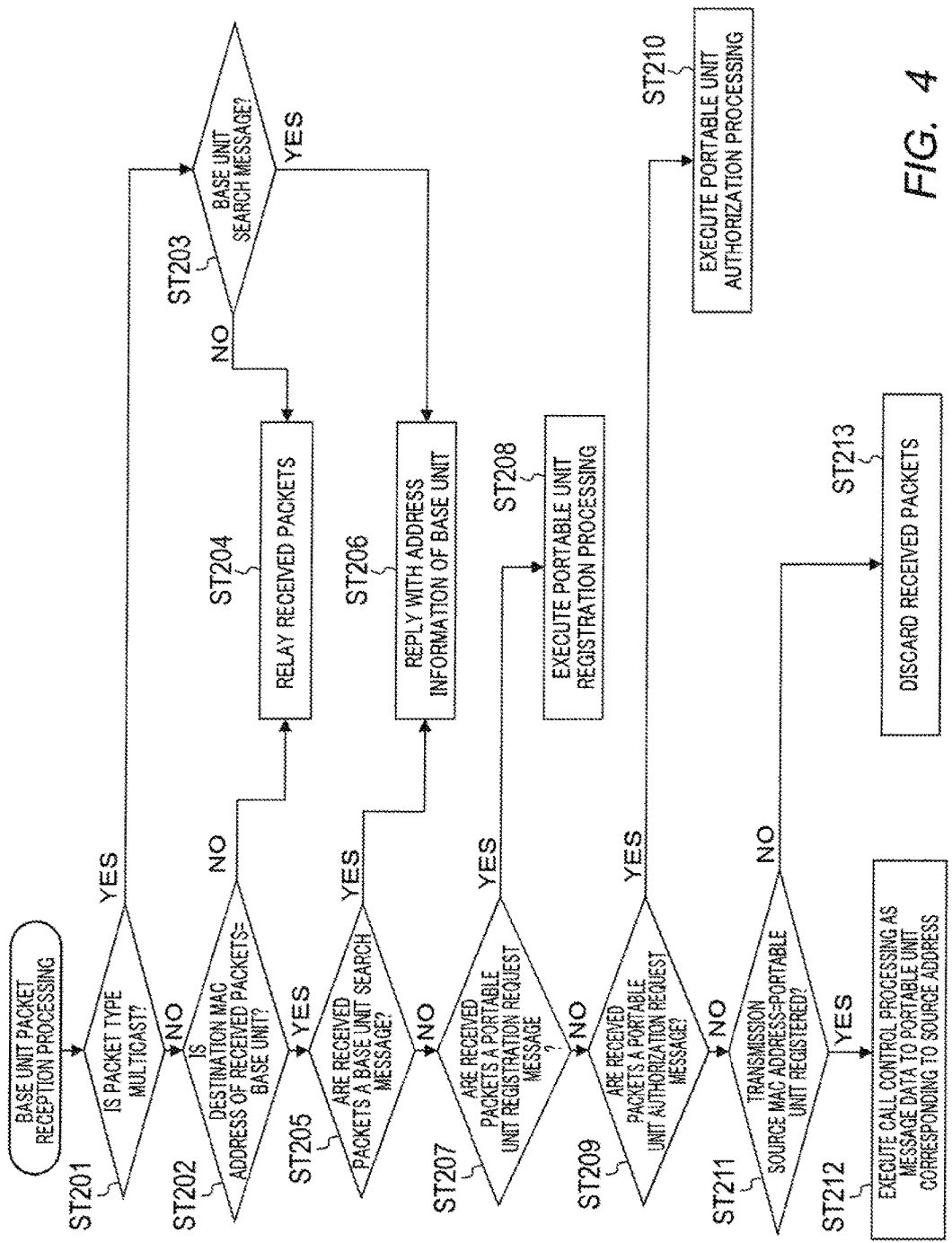
FIG. 4 is a flowchart illustrating packet reception processing of the cordless telephone base unit shown in FIG. 2.

FIG. 4 is a flowchart illustrating packet reception processing of cordless telephone base unit 10 shown in FIG. 2. In step ST201, wireless LAN bridge control section 119 determines whether or not the received packets are multicast packets. If the received packets are multicast packets (ST201: Yes), the process moves to step ST203, while if the received packets are unicast packets (ST201: No), the process moves to step ST202.

In step ST202, wireless LAN bridge control section 119 determines whether or not the destination MAC address of the received packet is cordless telephone base unit 10. If the destination MAC address is cordless telephone base unit 10 (ST202: Yes), the process moves to step ST205, while if the destination MAC address is not cordless telephone base unit 10 (ST202: No), the process moves to step ST204.

In step ST203, IP telephone control section 113 determines whether or not the received packets are a base unit search message. If the received packets are a base unit search message (ST203: Yes), the process moves to step ST206, while if the received packets are not a base unit search message (ST203: No), the process moves to step ST204.

In step ST204, wireless LAN bridge control section 119 performs relay processing that forwards received packets to access point 20.

In step ST205, IP telephone control section 113 determines whether or not the received packets are a base unit search message. If the received packets are a base unit search message (ST205: Yes), the process moves to step ST206, while if the received packets are not a base unit search message (ST205: No), the process moves to step ST207.

In step ST206, as address information of cordless telephone base unit 10, IP telephone control section 113 replies with the MAC address of cordless telephone base unit 10 and the IP address of SIP server 114.

In step ST207, IP telephone control section 113 determines whether or not the received packets are a portable unit registration request message. If the received packets are a portable unit registration request message (ST207: Yes), the process moves to step ST208, while if the received packets are not a portable unit registration request message (ST207: No), the process moves to step ST209.

In step ST208, portable unit registration section 111 performs portable unit registration processing. The portable unit registration processing is described in detail later.

In step ST209, IP telephone control section 113 determines whether or not the received packets are a portable unit authorization request message. If the received packets are a portable unit authorization request message (ST209: Yes), the process moves to step ST210, while if the received packets are not a portable unit authorization request message (ST209: No), the process moves to step ST211.

In step ST210, portable unit authorization section 112 performs portable unit authorization processing. The portable unit authorization processing is described in detail later.

In step ST211, IP telephone control section 113 determines whether or not the transmission source MAC address of the received packets is the MAC address of a registered portable unit. If the transmission source MAC address is the MAC address of a registered portable unit (ST211: Yes), the process moves to step ST212, while if the transmission source MAC address is not the MAC address of a registered portable unit (ST211: No), the process moves to step ST213.

In step ST212, IP telephone control section 113 performs call control processing with respect to the received packets as message data from a portable unit corresponding to the transmission source MAC address.

In step ST213, IP telephone control section 113 discards the received packets.

Figure 5:
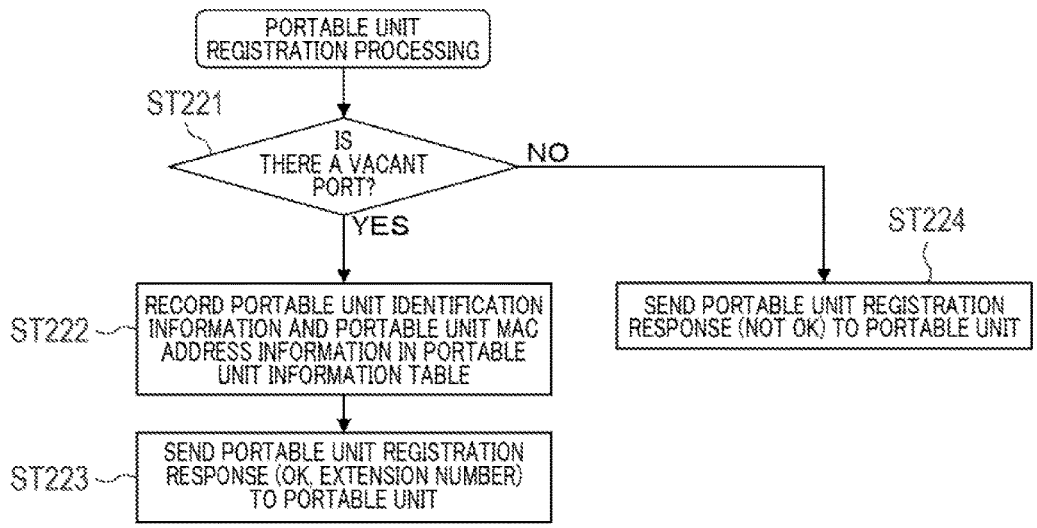
FIG. 5 is a flowchart illustrating portable unit registration processing that is shown in FIG. 4.

FIG. 5 is a flowchart illustrating portable unit registration processing that is shown in FIG. 4. In step ST221, portable unit registration section 111 determines whether or not there is a vacant port at which a portable unit can be newly registered. If there is a vacant port (ST221: Yes), the process moves to step ST222, while if there is no vacant port (ST221: No), the process moves to step ST224.

In step ST222, portable unit registration section 111 stores portable unit identification information and portable unit MAC address information in a portable unit management table (FIG. 11) of storage section 103. In step ST223, portable unit registration section 111 sends a portable unit registration response (including OK and an extension number or the like) to the portable unit that was registered.

In step ST224, portable unit registration section 111 sends a portable unit registration response (Not OK) to the portable unit.

Figure 6:
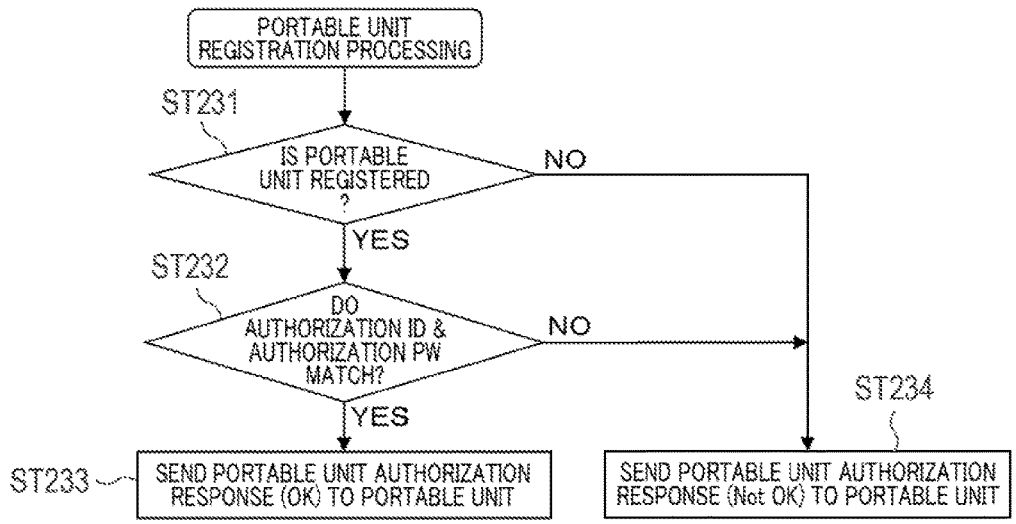
FIG. 6 is a flowchart illustrating portable unit authorization processing that is shown in FIG. 4.

FIG. 6 is a flowchart that illustrates portable unit authorization processing shown in FIG. 4. In step ST231, portable unit authorization section 112 determines whether or not the portable unit that sent the portable unit authorization request message is registered (the authorization ID and authorization password of the portable unit are registered). If the portable unit is registered (ST231: Yes), the process moves to step ST232, while if the portable unit is not registered (ST231: No), the process moves to step ST234.

In step ST232, portable unit authorization section 112 confirms a terminal identity whether or not the authorization ID and authorization password included in the portable unit authorization request message match an authorization ID and authorization password that are registered. If the authorization IDs and authorization passwords match (ST232: Yes), the process moves to step ST233, while if the authorization IDs and authorization passwords do not match (ST232: No), the process moves to step ST234.

In step ST233, portable unit authorization section 112 sends a portable unit authorization response (OK) to the portable unit, while in step ST234 portable unit authorization section 112 sends a portable unit authorization response (NO) to the portable unit.

Figure 7:
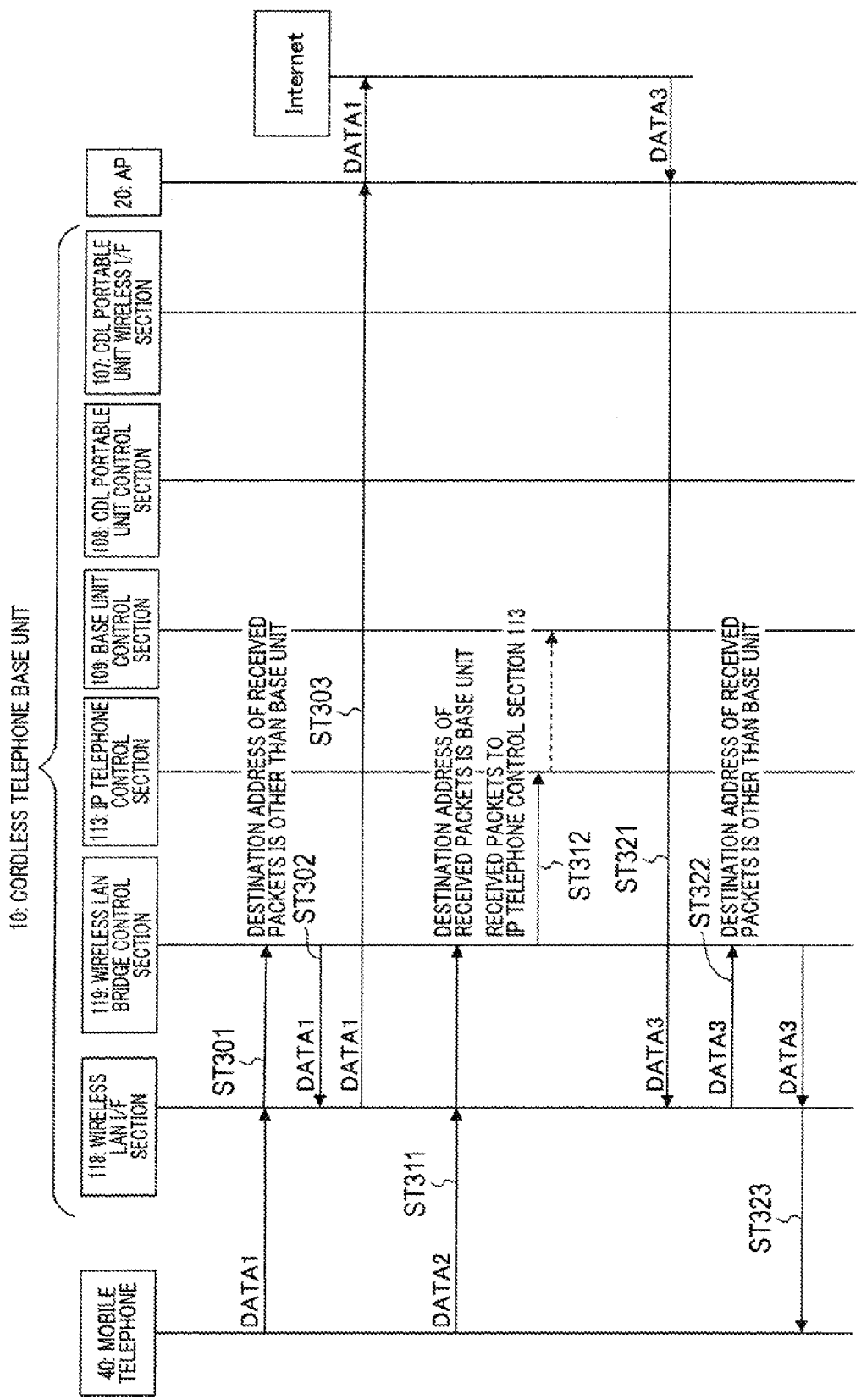
FIG. 7 is a sequence diagram illustrating procedures of wireless LAN bridge control in the cordless telephone base unit shown in FIG. 2.

Next, the procedures of wireless LAN bridge control in cordless telephone base unit 10 shown in FIG. 2 will be described using FIG. 7.

In step ST301, wireless LAN bridge control section 119 receives packet data 1 (DATA 1) from mobile telephone 40. If wireless LAN bridge control section 119 determines that the destination address of the received packets is an address other than cordless telephone base unit 10, in step ST302 and step ST303 wireless LAN bridge control section 119 sends the received packet data 1 to the Internet through wireless LAN I/F section 118 and access point 20.

Further, in step ST311 wireless LAN bridge control section 119 receives packet data 2 (DATA 2) from mobile telephone 40. If wireless LAN bridge control section 119 determines that the destination address of the received packets is cordless telephone base unit 10, in step ST312 wireless LAN bridge control section 119 outputs the received packet data 2 to IP telephone control section 113 and the like.

Furthermore, in step ST321 and step ST322, wireless LAN bridge control section 119 receives packet data 3 (DATA 3) from the Internet via access point 20 and wireless LAN I/F section 118. In step ST323, if wireless LAN bridge control section 119 determines that the destination address of the received packets is other than cordless telephone base unit 10, wireless LAN bridge control section 119 sends the received packet data 3 to mobile telephone 40 through wireless LAN I/F section 118.

Figure 8:
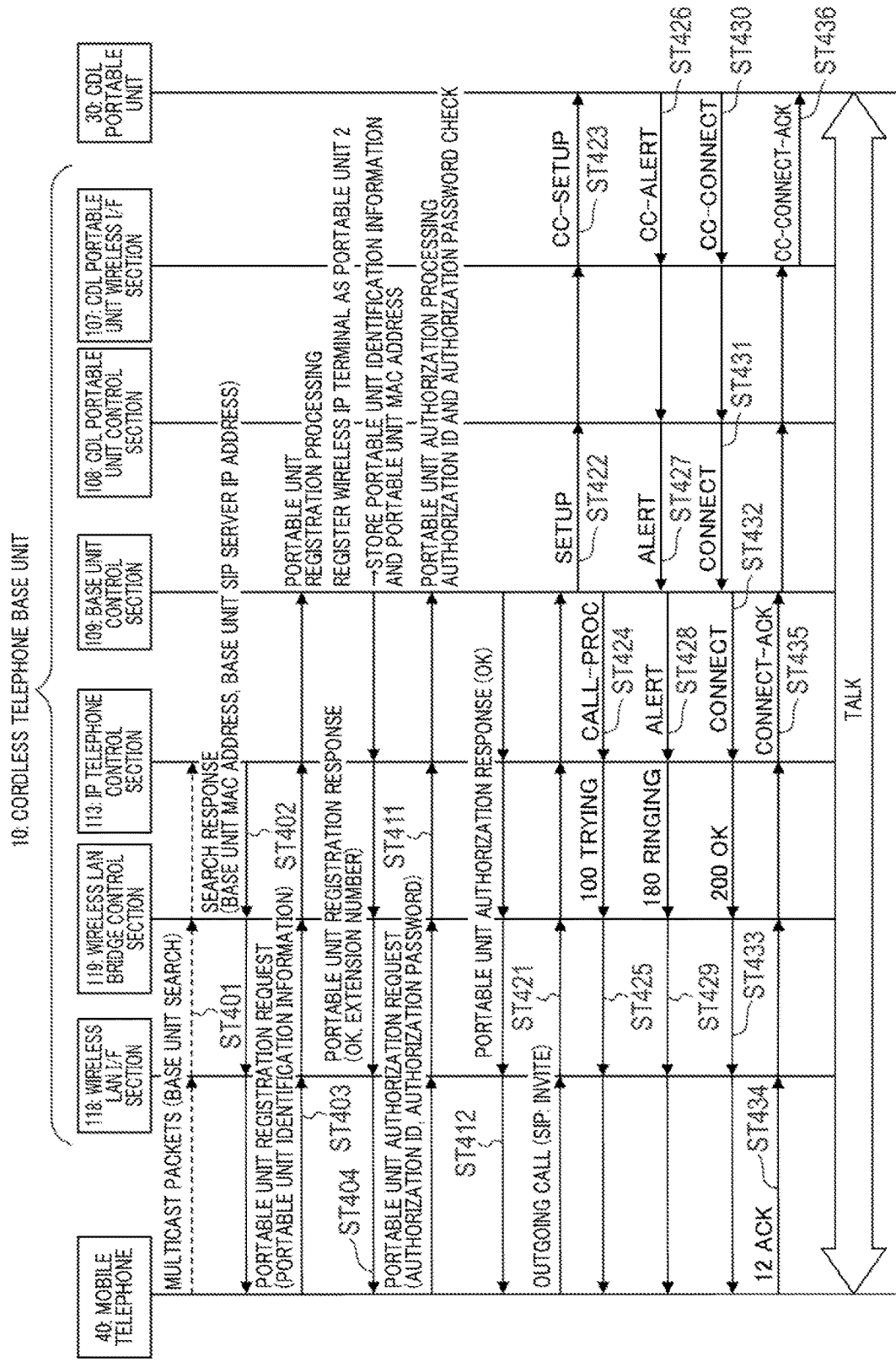
FIG. 8 is a sequence diagram illustrating procedures for portable unit registration and portable unit authorization of mobile telephone as well as procedures for extension calls between portable units in the cordless telephone base unit shown in FIG. 2.

Next, procedures for portable unit registration, portable unit authorization, and extension calls between portable units with respect to mobile telephone 40 that are performed at cordless telephone base unit 10 shown in FIG. 2 will be described using FIG. 8.

First, portable unit registration procedures for mobile telephone 40 will be described. In step ST401, IP telephone control section 113 receives multicast packets (a base unit search message) from mobile telephone 40 through wireless LAN I/F section 118 and wireless LAN bridge control section 119. In step ST402, IP telephone control section 113 replies with the MAC address of cordless telephone base unit 10 and the IP address of the SIP server (call control server) as a search response to mobile telephone 40.

In step ST403, mobile telephone 40 sends a portable unit registration request including portable unit identification information such as extension name or user-ID code set by a user to base unit control section 109, and as portable unit registration processing, base unit control section 109 registers mobile telephone 40 as a portable unit and also stores the identification information of the portable unit and the portable unit MAC address. In step ST404, base unit control section 109 sends a portable unit registration response (OK and extension number) to mobile telephone 40.

Next, portable unit authorization procedures for mobile telephone 40 will be described. In step ST411, base unit control section 109 receives a portable unit authorization request message including an authorization ID and authorization password from mobile telephone 40, and base unit control section 109 performs portable unit authorization processing. That is, base unit control section 109 checks whether or not the received authorization ID and authorization password match an authorization ID and authorization password that are registered. If the authorization IDs and authorization passwords match, in step ST412 base unit control section 109 sends the portable unit authorization response (OK) to mobile telephone 40.

Next, extension call procedures between mobile telephone 40 and cordless telephone portable unit 30 will be described. When base unit control section 109 receives an outgoing call (INVITE message) from mobile telephone 40 in step ST421, in the subsequent step ST422 base unit control section 109 outputs SETUP to the cordless telephone portable unit wireless I/F section, and in step ST423 cordless telephone portable unit wireless I/F section 107 sends CC (Call Control)-SETUP to cordless telephone portable unit 30.

On the other hand, in step ST424, base unit control section 109 that received the outgoing call from mobile telephone 40 outputs CALL-PROC to IP telephone control section 113. In step ST425, IP telephone control section 113 sends 100 TRYING to mobile telephone 40.

In step ST426, cordless telephone portable unit 30 that received CC-SETUP sends CC-ALERT to cordless telephone portable unit wireless I/F section 107. In step ST427, cordless telephone portable unit wireless I/F section 107 outputs ALERT to base unit control section 109.

In step ST428, base unit control section 109 outputs ALERT to IP telephone control section 113. In step ST429, IP telephone control section 113 sends 180 RINGING to mobile telephone 40.

In step ST430, cordless telephone portable unit 30 sends CC-CONNECT to cordless telephone portable unit wireless I/F section 107. In step ST431, cordless telephone portable unit wireless I/F section 107 outputs CONNECT to base unit control section 109.

In step ST432, base unit control section 109 outputs CONNECT to IP telephone control section 113. In step ST433, IP telephone control section 113 sends 200 OK to mobile telephone 40.

In step ST434, mobile telephone 40 sends 12 ACK to IP telephone control section 113. In step ST435, IP telephone control section 113 outputs CONNECT-ACK to cordless telephone portable unit wireless I/F section 107. In step ST436, cordless telephone portable unit wireless I/F section 107 sends CC-CONNECT-ACK to cordless telephone portable unit 30.

Thus, through a sequence of operations that include signal transmission, calling, and response, a speech channel is established between mobile telephone 40 and cordless telephone portable unit 30 through cordless telephone base unit 10.

By the above described procedures, the SIP and DECT protocols are associated, and an extension call is possible between mobile telephone 40 and cordless telephone portable unit 30.

Figure 9:
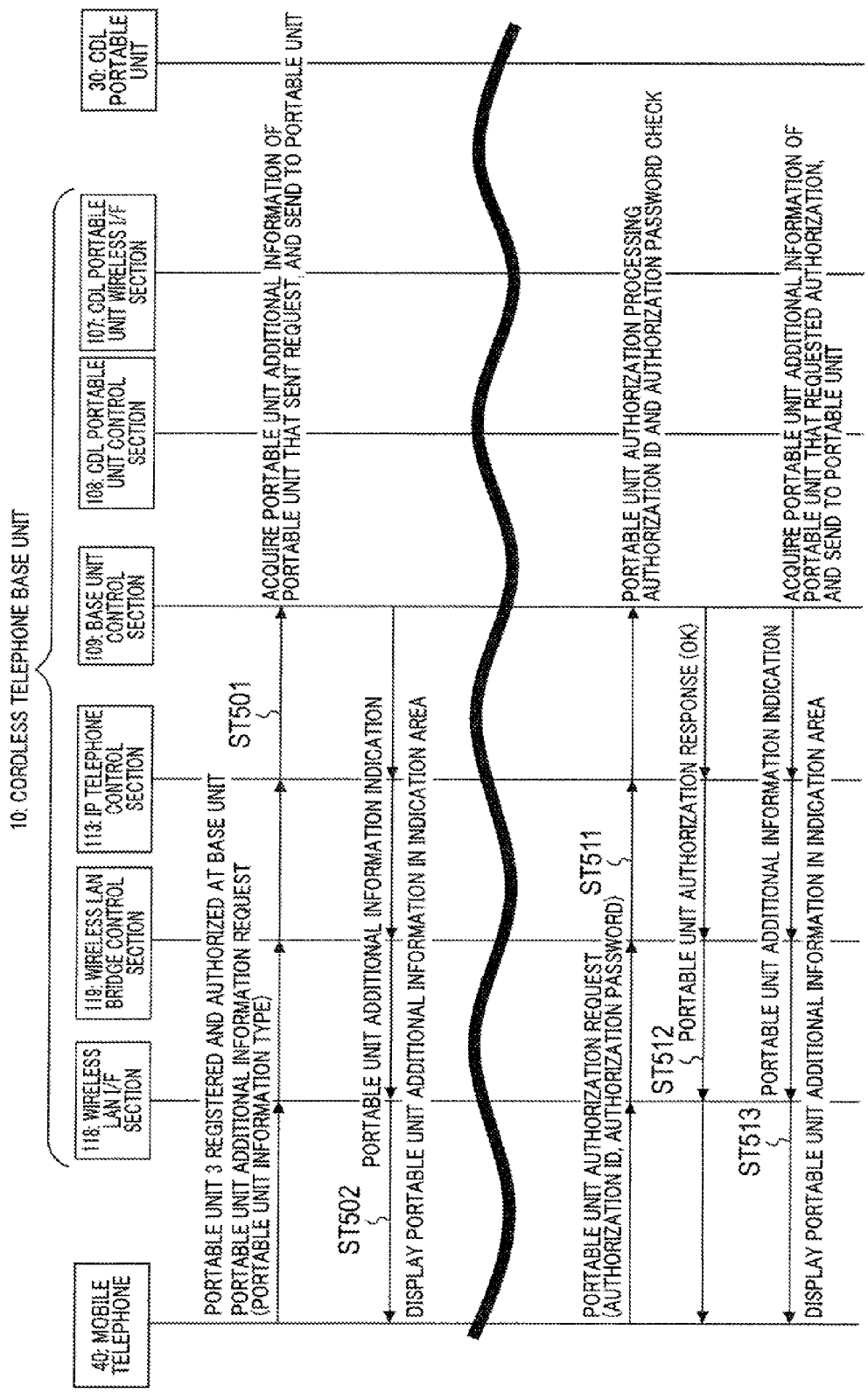
FIG. 9 is a sequence diagram illustrating procedures by which the cordless telephone base unit shown in FIG. 2 sends portable unit additional information to a mobile telephone.

Next, procedures whereby cordless telephone base unit 10 shown in FIG. 2 sends portable unit additional information to mobile telephone 40 are described using FIG. 9.

In step ST501, base unit control section 109 receives a portable unit additional information request message from mobile telephone 40 which has already been registered and authorized at cordless telephone base unit 10. In step ST502, base unit control section 109 acquires the portable unit additional information of the portable unit (mobile telephone 40) that requested the portable unit additional information, and sends the acquired portable unit additional information to mobile telephone 40.

The portable unit additional information may also be sent in the following manner. In step ST511, base unit control section 109 receives a portable unit authorization request message including an authorization ID and an authorization password from mobile telephone 40 which has already been registered at cordless telephone base unit 10, and the base unit control section performs portable unit authorization processing. That is, base unit control section 109 checks whether or not the received authorization ID and authorization password match a registered authorization ID and authorization password, and if the authorization IDs and authorization passwords match, in step ST512 base unit control section 109 sends the portable unit authorization response (OK) to mobile telephone 40. In addition, in step ST513, base unit control section 109 acquires portable unit additional information of the portable unit that requested authorization (mobile telephone 40), and sends the acquired portable unit additional information to mobile telephone 40. Thus, upon completion of authorization, the portable unit additional information is automatically sent from cordless telephone base unit 10.

FIG. 10 illustrates an example of a wireless LAN address information table of SIP server 114. FIG. 10 illustrates a case in which the MAC addresses of five portable units can be registered at cordless telephone base unit 10. As shown in FIG. 10, the wireless LAN address information table includes the IP address and MAC address of cordless telephone base unit 10, the MAC address of access point 20, and the MAC addresses of portable units 1 to 5. Wireless LAN bridge control section 119 refers as necessary to the wireless LAN address information table of SIP server 114 and performs packet forward processing.

FIG. 11 illustrates an example of a portable unit management table of storage section 103. FIG. 11 illustrates an example in which two cordless telephone portable units (portable units 1 and 2) and two mobile telephones (portable units 3 and 4) are registered. Note that, portable unit 5 is shown in an unregistered state. As shown in FIG. 11, in the portable unit management table, an extension number, a connection state, an extension name, a portable unit type, a MAC address, an authorization ID, and an authorization password are associated with each of portable units 1 to 5. In FIG. 11, although the extension name is used as the authorization ID, any identification information of the mobile telephone can be used for the authorization ID. Further, the MAC address (including a part thereof) of the mobile telephone may be used as the authorization password. Portable unit registration section 111 and portable unit authorization section 112 manage portable units by registering the portable units in the portable unit management table of storage section 103 and updating the information.

Figure 12:
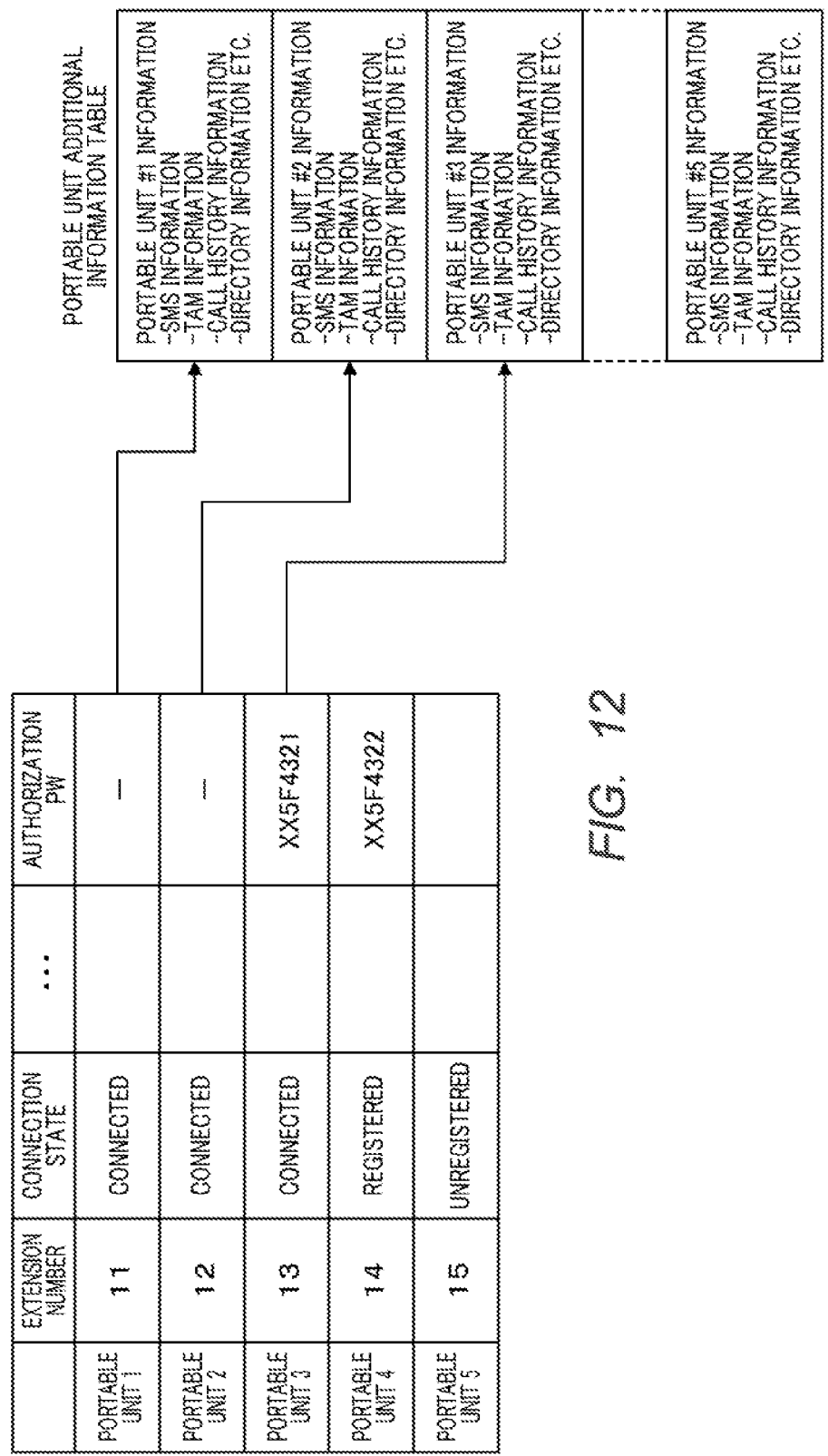
FIG. 12 illustrates an example of a portable unit additional information table of the storage section.

FIG. 12 is a view illustrating an example of a portable unit additional information table of storage section 103. FIG. 12 illustrates the portable unit additional information table in such a way as to correspond to the portable unit management table shown in FIG. 11. That is, the portable unit additional information table manages portable unit additional information of each of the five portable units. As shown in FIG. 12, as examples of the portable unit additional information of each portable unit, dates and times that short messages were generated at the portable unit, phone numbers of other parties, SMS information (SMS messages) including text messages, telephone answering machine (TAM) information, times of outgoing and incoming calls from and to the portable unit, call history information including phone numbers of other parties, and directory information and the like may be mentioned. The base unit control section sends the relevant portable unit additional information upon receiving a portable unit additional information request message from a currently connected mobile telephone 40 that has already been registered and authorized as a portable unit, or sends the relevant portable unit additional information to mobile telephone 40 that made a portable unit authorization request.

Thus, according to the present embodiment, cordless telephone base unit 10 replies with the address information of cordless telephone base unit 10 to mobile telephone 40 that sent a base unit search message by multicast transmission and registers the relevant mobile telephone 40 as a portable unit. As a result, mobile telephone 40 having a wireless LAN communication function that can connect to the Internet can be utilized as a portable unit in the home. Thus, mobile telephone 40 can coexist with cordless telephone portable unit 30 that adopts the PHS protocol or DECT protocol, and mobile telephone 40 can be utilized for extension calls with portable units adopting the DECT protocol as well as an outgoing/incoming call service that uses a landline telephone network to which cordless telephone base unit 10 is connected.

Further, by providing cordless telephone base unit 10 with wireless LAN bridge control section 119 that forwards received packets in accordance with a destination address of the received packets, even in a case where radio signals from a wireless access point do not directly reach mobile telephone 40 in the home, cordless telephone base unit 10 can relay the radio signals between mobile telephone 40 and the wireless access point. Further, mobile telephone 40 that is outside the home can be utilized as a cordless telephone portable unit through a wireless access point, and can access to cordless telephone base unit 10 that is in the home from an office and check the history of incoming calls or SMS messages that are received during the user's absence from the home.

Note that, although SIP is described as an example of a communication protocol between mobile telephone 40 and cordless telephone base unit 10 according to the present embodiment, the present invention is not limited to SIP protocol, and for example, ITU-T standard H.323 protocol or the like may also be used.

As has been described, the cordless telephone equipment, the cordless telephone system, and the communication method thereof according to the present invention are useful for utilizing a wireless IP terminal having a wireless LAN communication function capable of connecting to the Internet, as a cordless telephone portable unit in the home and outside the home, also for allowing the wireless IP terminal to coexist with a cordless telephone portable unit having no wireless LAN communication function, and for relaying radio signals between the wireless IP terminal and a wireless access point in a case where the radio signals do not directly reach the wireless IP terminal from the wireless access point in the home.

INCORPORATION BY REFERENCE

The present application claims priority from Japanese application JP 2013-120032 filed on Jun. 6, 2013, the content of which is hereby incorporated by reference into this application.

The invention claimed is:

1. Cordless telephone equipment comprising:
a handset that is a non IP terminal; and
a base unit that connects with the handset by radio, wherein
the base unit comprises:
  a handset controller that controls a communication protocol between the base unit and the handset through a wireless interface that connects with the handset by radio;
  a wireless LAN interface that transmits and receives packet data to and from a wireless IP terminal;
  a base unit controller that processes a message received from the handset controller and executes a call control, and receives, from the wireless IP terminal through the wireless LAN interface, packet data having address information of the base unit as a destination address, wherein
the base unit controller comprises:
  an IP telephone controller that includes an IP call control server and that performs, when the packet data received from the wireless IP terminal is an IP telephone message, processing to convert the IP telephone message to an internal message format to be processed within the base unit controller and processing to convert an internal message within the base unit controller into the IP telephone message to control a communication protocol with the wireless IP terminal; and
  a handset register that registers the wireless IP terminal as a handset when the packet data received from the wireless IP terminal is a handset registration request message, wherein
the base unit controller processes, among the packet data received from the wireless IP terminal, packet data received from a wireless IP terminal that has been registered by the handset register, as message data received from a handset under control of the base unit, and executes a call control common to a handset that is the non IP terminal, for a wireless IP terminal whose registration by the handset register has been confirmed.

2. The cordless telephone equipment according to claim 1, wherein the base unit further comprises a base unit searcher that, when the packet data received from the wireless IP terminal is a base unit search message, replies to the wireless IP terminal, with address information of the IP call control server incorporated in the base unit.

3. The cordless telephone equipment according to claim 2, wherein the address information of the base unit is a MAC address of the base unit and an IP address of the IP call control server.

4. A cordless telephone system which is the cordless telephone equipment according to claim 1, further comprising a handset authenticator that, when the packet data received from a wireless IP terminal that has been registered as a handset is a handset authentication message, confirms terminal identity with the wireless IP terminal that has been registered as a handset, using an authentication ID and an authentication password that are included in the handset authentication message.

5. The cordless telephone system according to claim 4, wherein
the authentication ID is identification information of the wireless IP terminal, and
the authentication password is a MAC address of the wireless IP terminal.

6. A cordless telephone system comprising:
the cordless telephone equipment according to claim 1; and
a wireless IP terminal that transmits and receives packet data to and from a base unit of the cordless telephone equipment through a wireless LAN and that is a subject for a call control as a handset under control of the base unit.

7. Cordless telephone equipment comprising:
a handset that is a non IP terminal; and
a base unit that connects with the handset by radio, wherein
the base unit comprises:
  a handset controller that controls a communication protocol between the base unit and the handset through a wireless interface that connects with the handset by radio;
  a wireless LAN interface that transmits and receives packet data to and from a wireless IP terminal;
  a base unit searcher that, upon receiving a base unit search message from the wireless IP terminal, replies to the wireless IP terminal, with address information of an IP call control server incorporated in the base unit;
  an IP telephone controller that includes the IP call control server and that performs processing to convert an IP telephone message from the wireless IP terminal to an internal message format to be processed within the base unit controller and processing to convert an internal message within the base unit controller into the IP telephone message to control a communication protocol with the wireless IP terminal;
  a wireless LAN bridge controller that, upon receiving from the wireless IP terminal, packet data having address information of the base unit as a destination address, forwards the received packet data to the IP telephone controller;
  a handset register that receives a handset registration request message from the wireless IP terminal and registers the wireless IP terminal as a handset; and
  a base unit controller that processes, among the packet data forwarded to the IP telephone controller from the wireless IP terminal through the wireless LAN bridge controller, packet data received from the wireless IP terminal that has been registered by the handset register, as message data received from a handset under control of the base unit, and that executes a call control common to the handset that is the non IP terminal, for the wireless IP terminal whose registration by the handset register has been confirmed.

8. The cordless telephone equipment according to claim 7, wherein address information of the base unit is a MAC address of the base unit and an IP address of the IP call control server.

9. A cordless telephone system comprising:
the cordless telephone equipment according to claim 7; and
a wireless IP terminal that transmits and receives packet data to and from a base unit of the cordless telephone equipment through a wireless LAN and that is a subject for a call control as a handset under control of the base unit.

10. A wireless communication method to be executed in a handset that is a non IP terminal and a base unit that connects with the handset by radio, the method comprising:
executing by the base unit, a communication protocol control between the base unit and the handset;
transmitting and receiving by the base unit, packet data to and from a wireless IP terminal;
receiving by the base unit, packet data having address information of the base unit as a destination address from the wireless IP terminal;
performing by the base unit, when the packet data received from the wireless IP terminal is an IP telephone message, processing to convert the IP telephone message to an internal message format and processing to convert the internal message into the IP telephone message to execute a communication protocol control with the wireless IP terminal;
registering by the base unit, the wireless IP terminal as a handset when the packet data received from the wireless IP terminal is a handset registration request message; and
processing by the base unit, the packet data received from the registered wireless IP terminal as message data received from a handset under control of the base unit and executing by the base unit, a call control common to a handset that is the non IP terminal, for the wireless IP terminal whose registration has been confirmed.

11. The wireless communication method according to claim 10, wherein, when the packet data received from the wireless IP terminal is a base unit search message, the base unit replies to the wireless IP terminal, with address information of the IP call control server incorporated in the base unit.

12. The wireless communication method according to claim 11, wherein the address information of the base unit is a MAC address of the base unit and an IP address of the IP call control server.

13. The wireless communication method according to claim 10, wherein, when the packet data received from a wireless IP terminal that has been registered as a handset is a handset authentication message, terminal identity with the wireless IP terminal that has been registered as a handset is confirmed using an authentication ID and an authentication password that are included in the handset authentication message.

14. The wireless communication method according to claim 13, wherein
the authentication ID is identification information of the wireless IP terminal, and
the authentication password is a MAC address of the wireless IP terminal.

* * * * *